G. DICKERSON & DE FOREST HAMILTON.
WOODWORKING MACHINE.
APPLICATION FILED JAN. 10, 1916.

1,264,026.

Patented Apr. 23, 1918.
11 SHEETS—SHEET 1.

Inventors
Glenn Dickerson
De Forest Hamilton
By Moulton & Liviance
Attorneys.

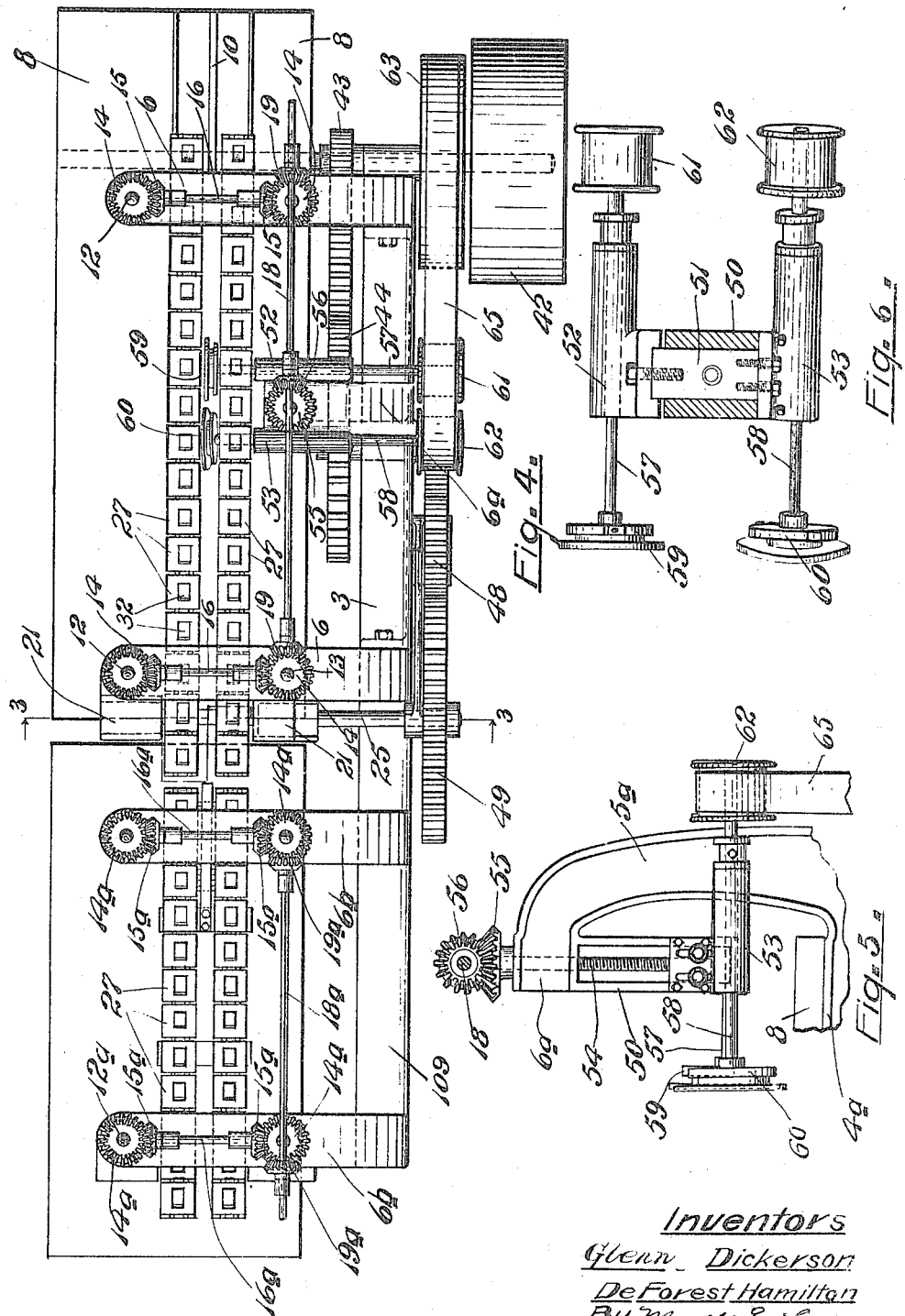

G. DICKERSON & DE FOREST HAMILTON.
WOODWORKING MACHINE.
APPLICATION FILED JAN. 10, 1916.
1,264,026.
Patented Apr. 23, 1918.
11 SHEETS—SHEET 5.
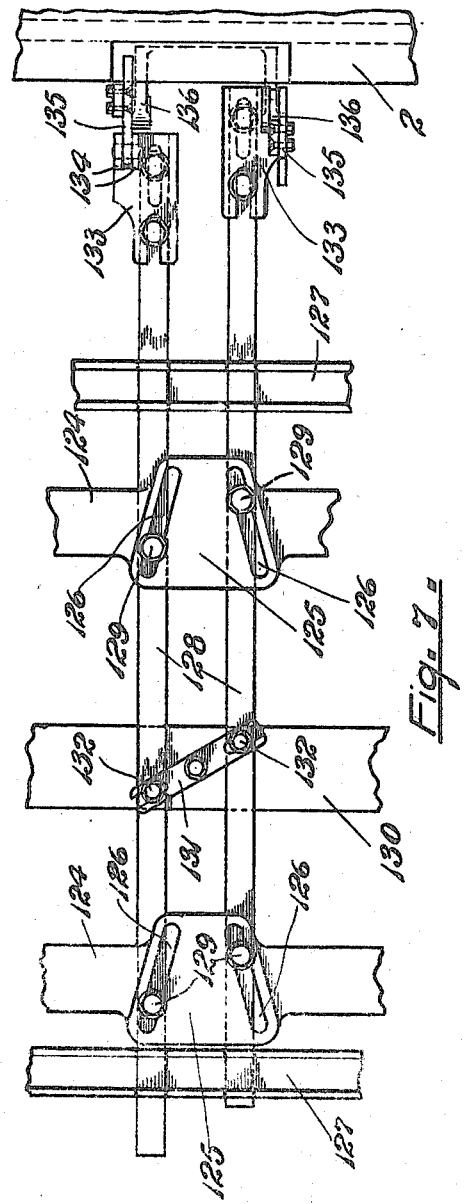
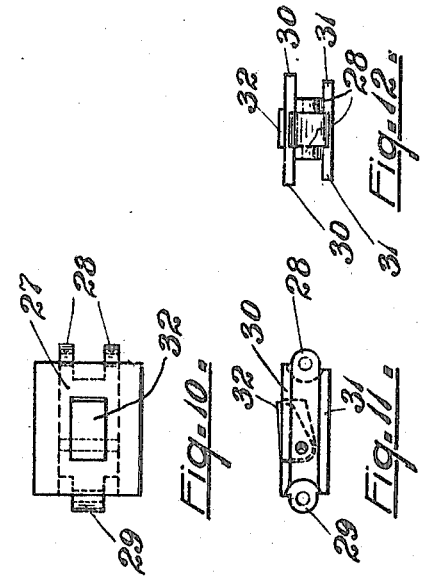
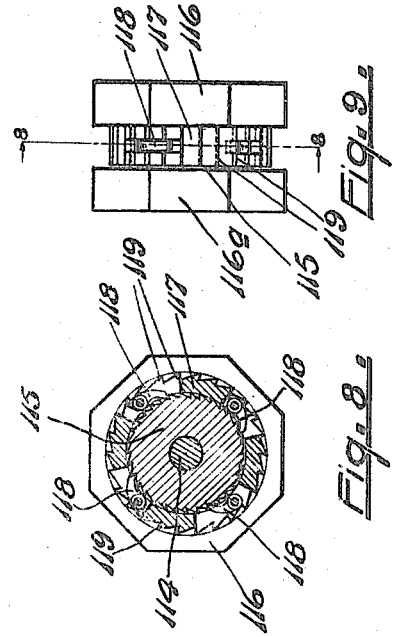
Inventors
Glenn Dickerson
De Forest Hamilton
By Moulton & Linnaus
Attorneys.

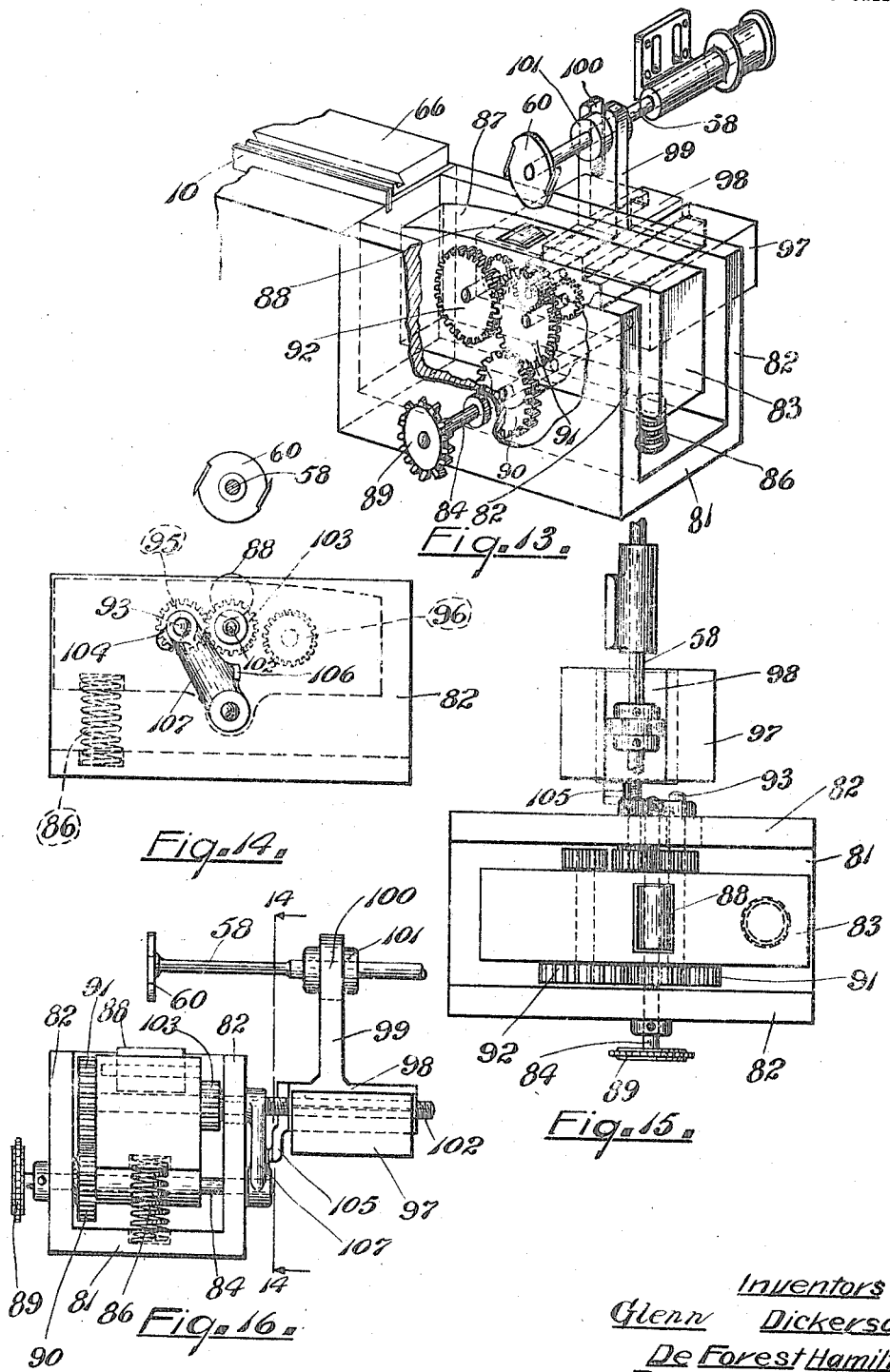

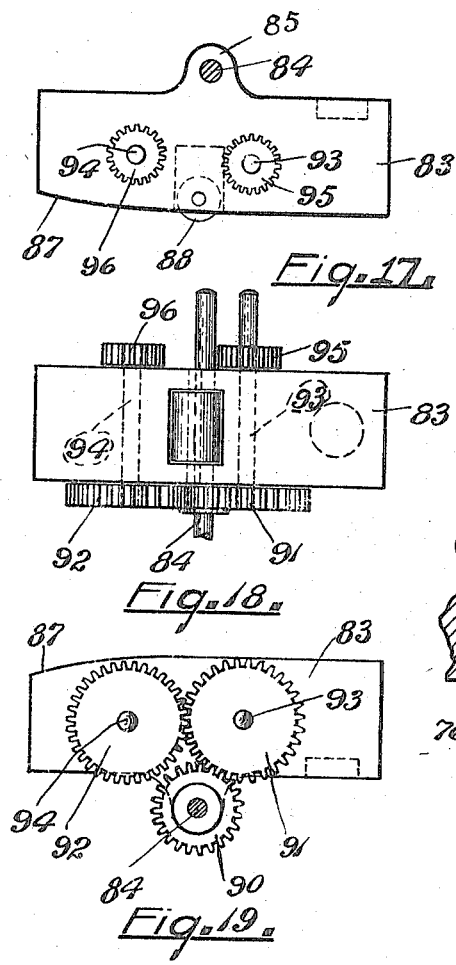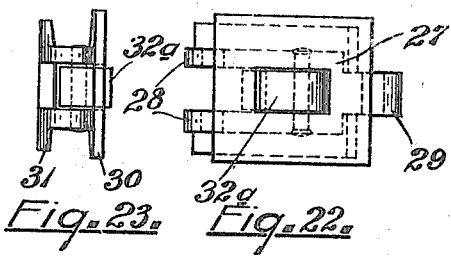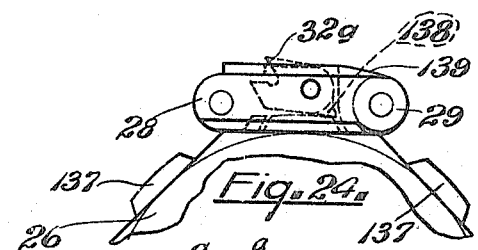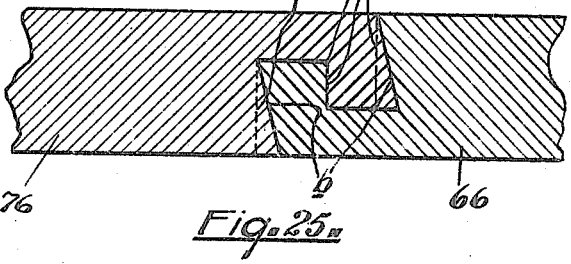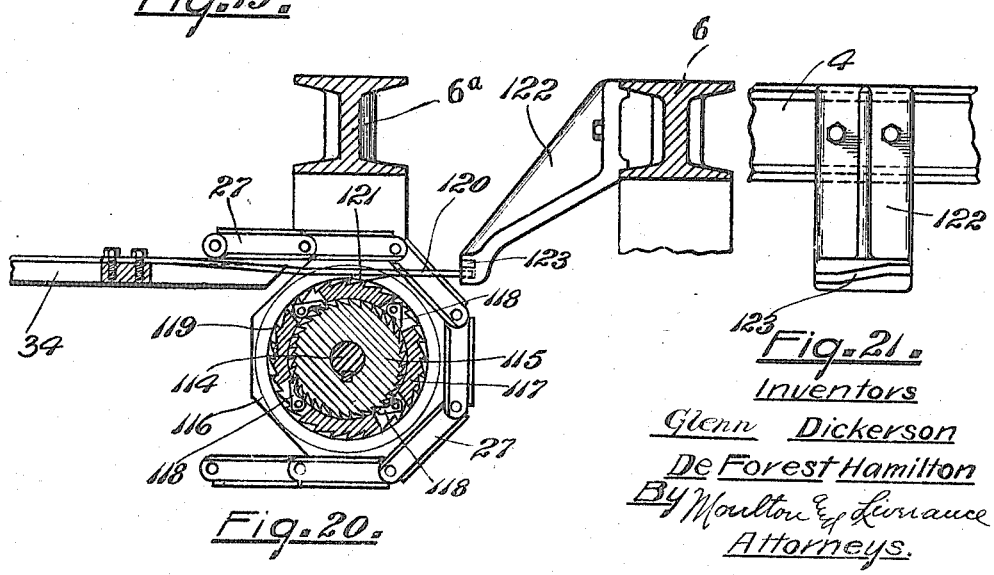

G. DICKERSON & DE FOREST HAMILTON.
WOODWORKING MACHINE.
APPLICATION FILED JAN. 10, 1916.
1,264,026.
Patented Apr. 23, 1918.
11 SHEETS—SHEET 8.
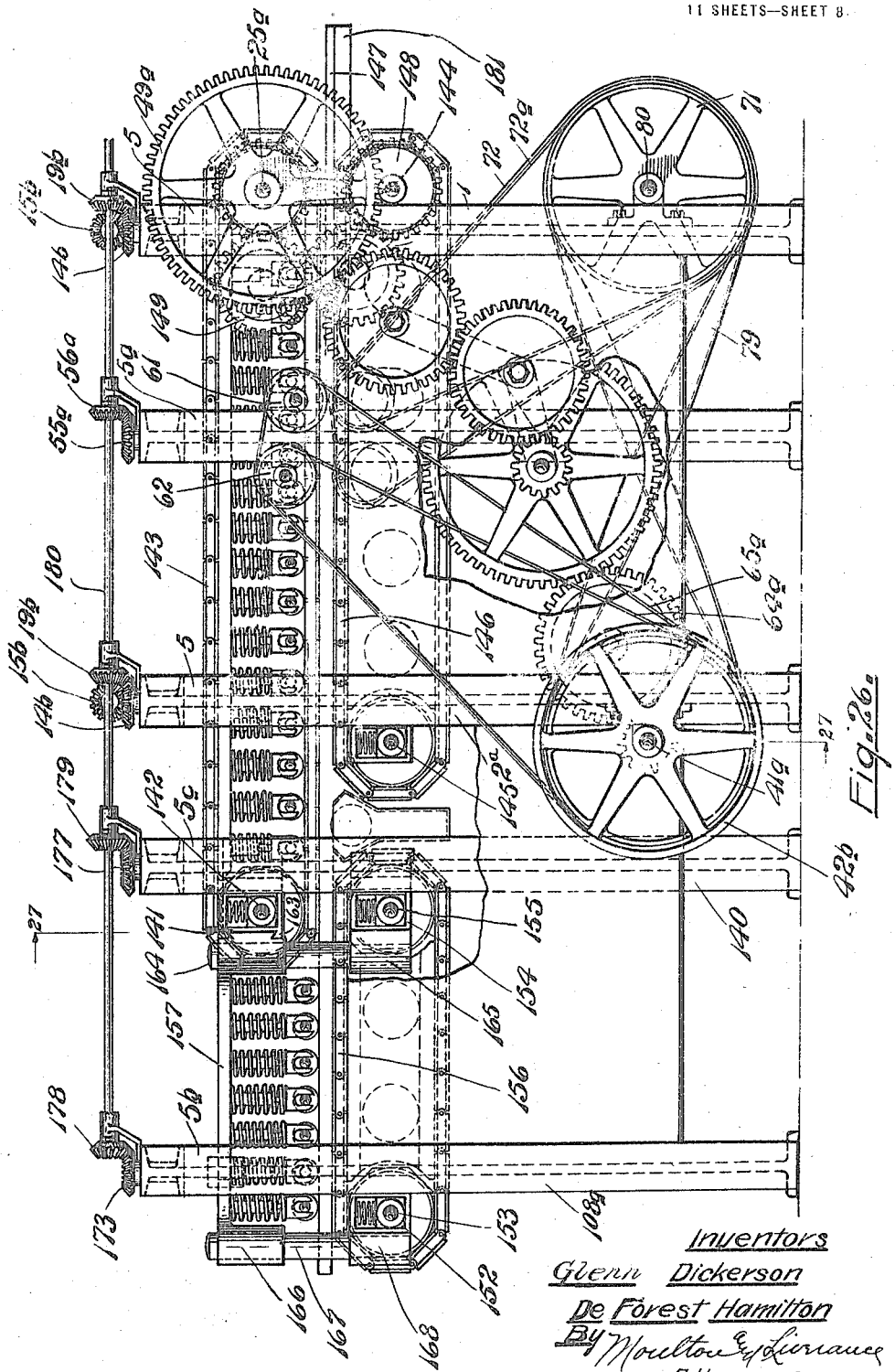
Inventors
Glenn Dickerson
De Forest Hamilton
By Moulton & Lurrance
Attorneys.

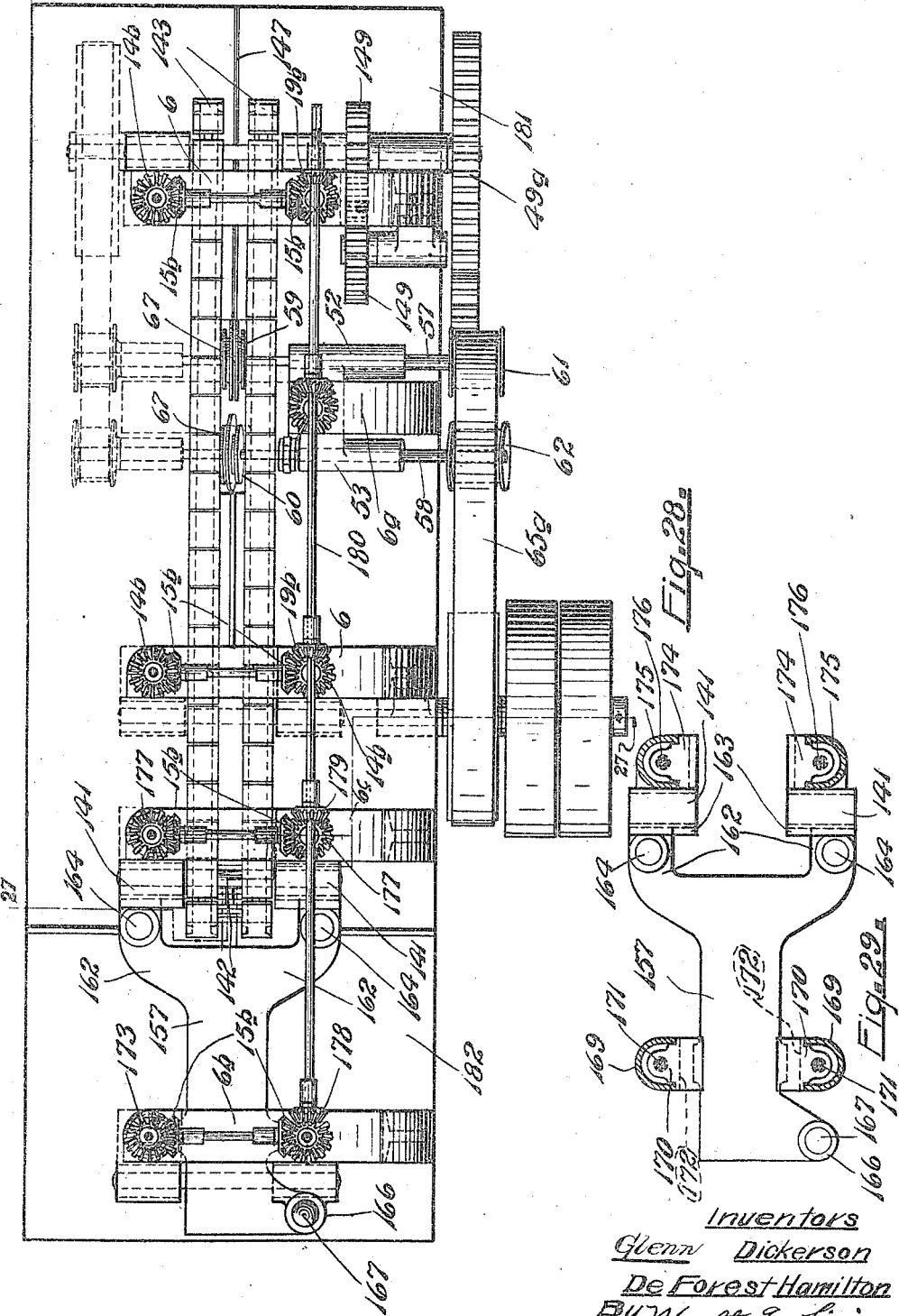

UNITED STATES PATENT OFFICE.

GLENN DICKERSON AND DE FOREST HAMILTON, OF GRAND RAPIDS, MICHIGAN, ASSIGNORS TO THE DICKERSON GLUE JOINTER COMPANY, OF GRAND RAPIDS, MICHIGAN, A CORPORATION OF MICHIGAN.

WOODWORKING-MACHINE.

1,264,026.  Specification of Letters Patent.  Patented Apr. 23, 1918.

Application filed January 10, 1916. Serial No. 71,372.

*To all whom it may concern:*

Be it known that we, GLENN DICKERSON and DE FOREST HAMILTON, citizens of the United States of America, residing at Grand Rapids, in the county of Kent and State of Michigan, have invented certain new and useful Improvements in Woodworking-Machines; and we do hereby declare the following to be a full, clear, and exact description of the invention, such as will enable others skilled in the art to which it appertains to make and use the same.

This invention relates to a lumber joining wood working machine. It is desirable in a great many instances to join boards together at their edges in such manner that when a plurality of boards have been so connected they will form in effect one wide board, the width of which is equal to the combined widths of the boards joined together. A machine for effecting this should occupy minimum floor space and be capable of quick and easy adjustment for different thicknesses of boards.

One of the main objects of our invention is to provide a machine for joining lumber together which can be very quickly set for any desired thickness of lumber and which can be changed to another thickness quite as quickly. A still further object of the invention consists in the provision of a machine in which the boards to be joined are fed in at the same end of the machine, this greatly reducing the length of the machine and the space occupied by it in a factory and eliminating the necessity of changing the set-up for different lengths. A further object of the invention consists in the provision of a novel way and method of joining adjacent edges of lumber by use of a particular efficient and novel joint which is so formed that a board may be feed into the machine from one end thereof and have its parts of the joint cut and then shifted into position such that when the succeeding board to be jointed with the first one is fed into the machine and its part of the joint formed, the corresponding tongues and grooves of the two boards which enter into it to make up the joint are in alinement, one board being slid alongside the other with the coacting parts entering into proper joining relation. Many other novel and useful features of construction and operation other than these specifically enumerated and mechanism for accomplishing them will be apparent as the description of the embodiments shown progresses, and understanding of the constructions disclosed in the accompanying drawings is had.

In the drawings:

Fig. 4 is a plan view of the machine.

Fig. 5 is a fragmentary side elevation illustrating the mounting of the upper cutter heads.

Fig. 6 is a sectional and plan view of the upper cutter heads showing the mounting thereof for permitting their vertical adjustment.

Fig. 7 is a plan view of the shifting mechanism forming a part of the machine.

Fig. 8 is a vertical section on the line 8—8 of Fig. 9.

Fig. 9 is a side elevation of one of the modified forms of pulleys used at the rear part of the machine for controlling the movements of the idle chains positioned around said pulleys.

Figs. 10, 11 and 12 are, respectively, plan and side and end elevations of one of the links of the chains.

Fig. 13 is a perspective view of the mechanism for controlling the formation of a tongue and groove in one of the boards to be joined together so as to gradually increase their widths from one end to the other.

Fig. 14 is a section and side elevation on the line 14—14 of Fig. 16.

Fig. 15 is a plan of the mechanism shown in Fig. 13.

Fig. 16 is an end view taken from the right hand end of Fig. 13.

Fig. 17 is a plan view of the construction shown in Fig. 18.

Fig. 18 is a plan of the tilting block located within the housing and forming an element of the mechanism disclosed in Fig. 13.

Fig. 19 is a side elevation of said block.

Fig. 20 is a fragmentary section and elevation of the means for controlling the movements of the idle chains.

Fig. 21 is a front elevation of the element 122 shown in Fig. 20.

Figs. 22 and 23 are plan and end views respectively of a modified form of link used in the driving chains.

Fig. 24 is a side elevation of said link showing its operative relation with a modified form of drive pulley for a chain formed of said modified links.

Fig. 25 is a transverse section taken through two pieces of lumber joined together side by side illustrating the joint.

Fig. 26 is a rear elevation similar to Fig. 2 of a modified form of machine.

Fig. 28 is a plan view of the modified form of the machine.

Fig. 29 is a plan view of a detail of structure in said modified form of machine.

Like reference characters refer to like parts throughout the several views of the drawings.

Figure 1:
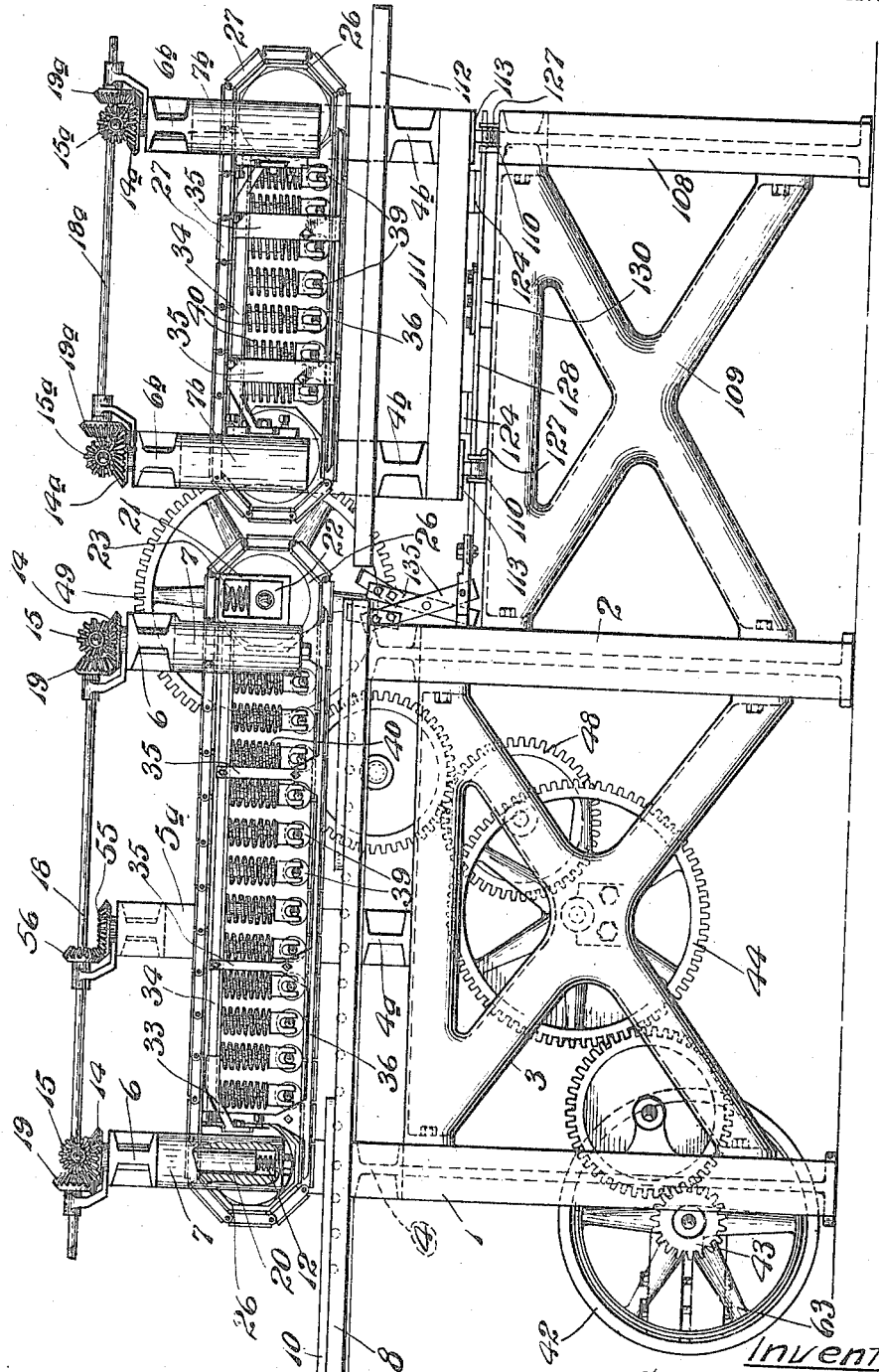
Figure 1 is a front elevation of a machine embodying our invention.
Figure 2:
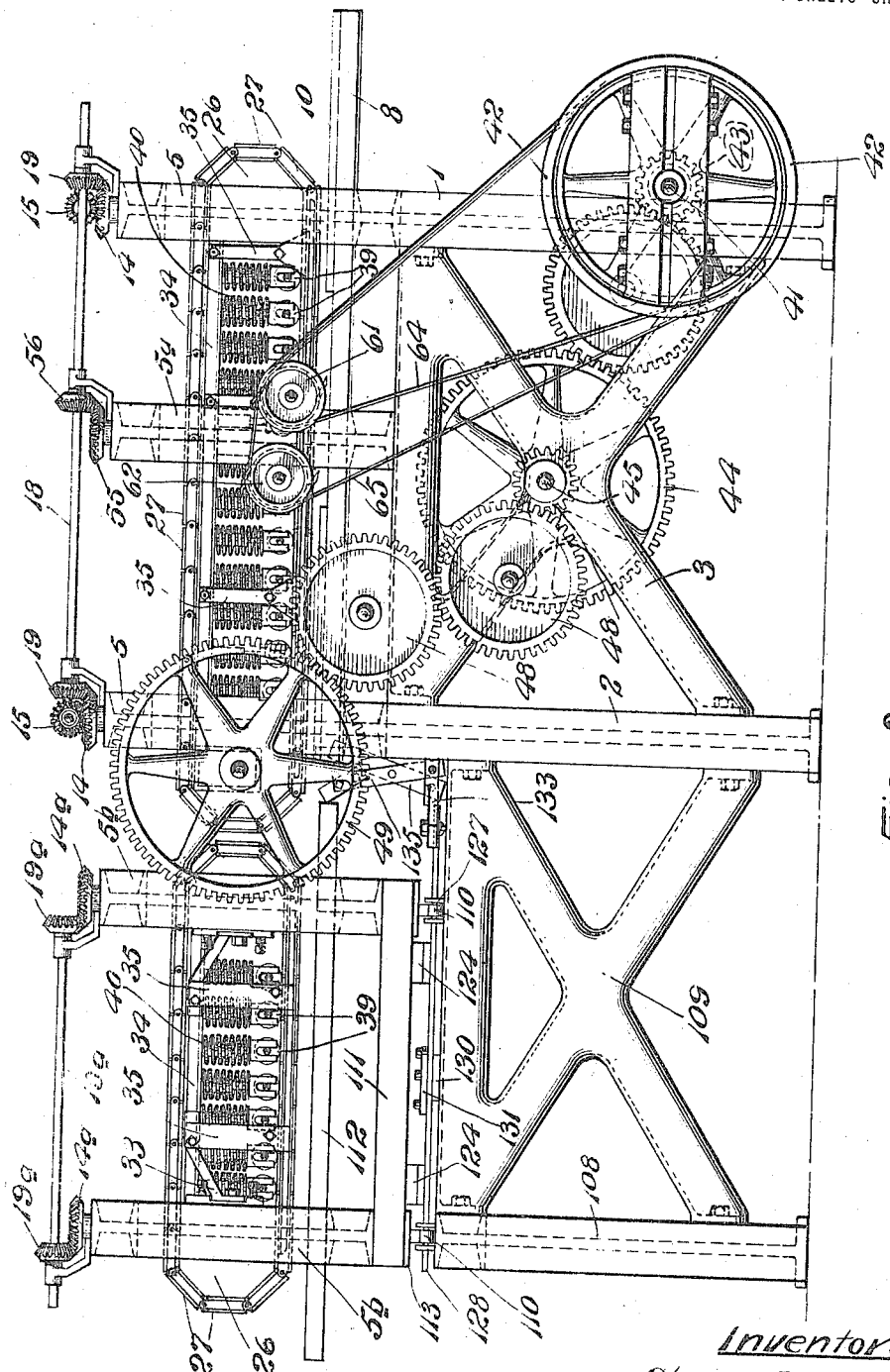
Fig. 2 is a rear elevation thereof.
Figure 3:
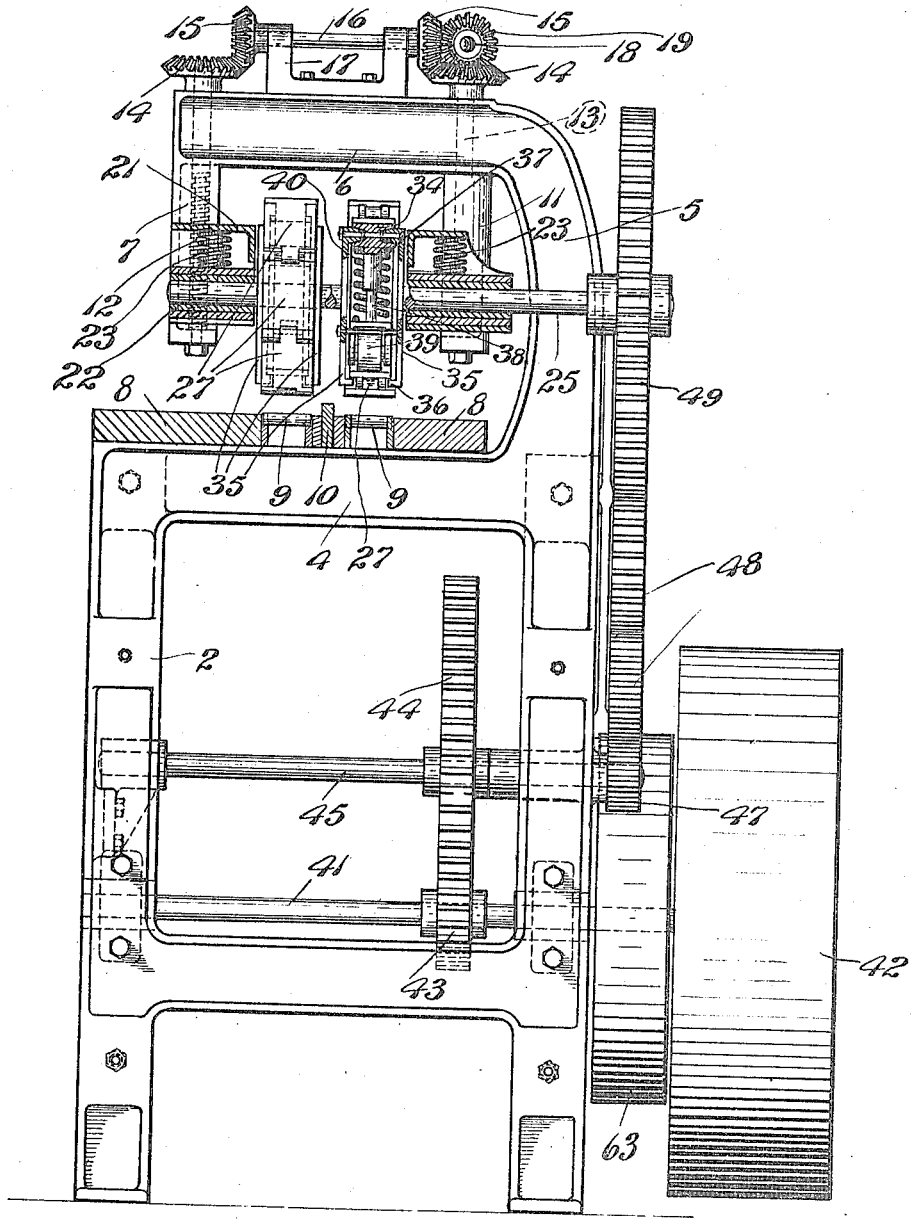
Fig. 3 is a vertical section taken substantially on the line 3—3 of Fig. 4 looking in the direction indicated by the arrows.

In the construction of the machine as shown in Figs. 1, 2 and 3, there is provided as a support for the forward portion of the machine front and rear end frames 1 and 2 which are connected by suitable side frames or braces 3. This is one form of support though it is of course understood that many other equivalent supporting structures may be used quite as well. Directly above the end frames 1 and 2 and, if desired, cast integrally with said frames are transverse members 4 which are extended at the rear side of the machine upwardly as indicated at 5 and thence over the supporting frame forming horizontal members 6 as shown. At the far ends of the members 6 downwardly projecting supports 7 are provided, the use of which will later appear. Between the members 4 is also located a transverse member 4$^a$ which is similarly extended upwardly at 5$^a$ and thence turned inwardly to the front for a short distance, as shown at 6$^a$ in Fig. 5, to serve as a support for the upper cutter heads as will hereafter appear. The upper edges of the members 4 and 4$^a$ lie in the same plane and a table comprised of horizontal members 8 is secured to and supported on said members 4 and 4$^a$, this table at two spaced apart points being equipped with a plurality of small rollers 9 between which is located an upwardly extending guide rib 10. The table 8 may be permanently connected to its supporting members 4 and 4$^a$ or it may be movably mounted thereon to permit a slight shifting of the table and the guides 10 using the same shifting mechanism later described, this being of use particularly with lumber which is somewhat bent out of shape so that its edge is not in a straight line.

Extending downwardly from each of the horizontal members 6 at the rear end of said members, and directly back of the support 7 is a vertical support 11 substantially similar to the support 7. Screw threaded shafts 12 and 13 pass downwardly through the horizontal members 6 into said supports 7 and 11 and are each provided at its upper end with a bevel gear 14, meshing with each of which is a bevel pinion 15, said pinions being mounted in pairs at the opposite ends of short shafts 16 supported in the brackets 17 which are carried one above each of the horizontal members 6. A horizontal shaft 18 lies lengthwise of and above the mechanism thus described carrying pinions 19 which mesh with one of the front and rear gears 14 described, it being apparent that on rotation of shaft 18 all of the screws 12 and 13 will be rotated simultaneously an equal amount and in the same direction. Each of the screws enters into a sleeve 20 located within the supports 7 and 11, the front sleeves having bearings connected with or formed integrally therewith to support a front shaft while each of the rear sleeves has a hollow casing 21 secured thereto in which is slidably mounted a bearing 22 normally held in lower position by a strong coil spring 23. A rear shaft 25 is mounted in and between the bearings 22, carrying two spaced apart drive pulleys or wheels 26 of octagonal outline. The front shaft also carries a similar pair of drive pulleys or wheels and surrounding the pulleys are two endless chains each formed of a series of links 27. The links are of especial formation having at one end spaced apart connecting ears 28 and at the opposite end a single centrally located ear or projection 29, the body of each link at its upper and lower edges being extended outwardly to form ribs 30 and 31 between which is a space left for the reception of a guide hereafter described. Each link on its outer side also carries a pivotally mounted dog 32 which has a limited pivotal movement.

Brackets 33 are secured to the front boxes or journals which carry the front shaft and between these brackets and the rear housings 21 extends a heavy bar 34 depending from which at intervals are tie bars 35 at their lower ends supporting guide ribs 36 turned inwardly toward each other as indicated in Fig. 3 and entering the groove between the projections 30 and 31 of the links. A plurality of projections 37 extend downwardly from the bars 34 and are bored to receive pins 38 each of which at its lower end carries a fork between the arms of which is mounted a roller 39. A strong coil spring is interposed between each of the forks and bar 34 surrounding parts 37 and 38 so as to normally press the roller against links of the chain which pass under it. There are a large number of these rollers in the length of the chain, enough being supplied that each link of the under stretch of the chain will have the roller pressing against it.

A shaft 41 is mounted adjacent the lower end and in front of the front supporting frame 1 and carries a drive wheel 42. A pinion 43 is mounted on the shaft 41 meshing with and driving by suitable gearing a gear 44 mounted on the shaft 45, this shaft being supported in suitable bearings in the parts 3 of the supporting frame. At its rear end shaft 45 carries a pinion 47 which by means of a train of gears 48 drives the gear 49 secured at the end of shaft 25. It is evident that the drive wheel 42 may receive a belt so that it may be driven from any suitable source of power and that when thus driven shaft 25 will rotate continuously but at a comparatively low rate of speed and will give a continuous movement to the drive chains. And it will also be evident that if a board of suitable thickness is introduced under either of the drive chains it will be carried to the rear on the rearward movement of the under section of said chain, dogs 32 falling by gravity and engaging with the surface of the board and moving it over the rollers 9.

A support 50 having spaced apart sides is cast integral with or otherwise suitably secured to the overhanging end 6ª of the bracket 5ª heretofore described. Between the sides of the support is mounted a block 51 having secured at its sides bearings 52 and 53 as shown in Fig. 6. A screw 54 passes downwardly through the part 6ª and into block 51, its upper end having a bevel pinion 55 which meshes with a pinion 56 mounted upon the shaft 13. The number of threads to the inch on screw 54 is one-half the number of threads to the inch on screws 12 and 13 and it will be evident that on rotation of shaft 18 and the consequent raising or lowering of the drive chains, the block 51 with its attached journals or bearings 52 and 53 will be raised and lowered simultaneously but only one-half of the amount. Shafts 57 and 58 are mounted, respectively, in bearings 52 and 53 and at their forward ends carry cutter heads 59 and 60, the rear ends of said shafts being provided with drive pulleys 61 and 62. It will be noted, referring to Figs. 5 and 6, that the shaft 58 is set at an angle to the horizontal so that the cutter head 60 is disposed at an angle to the vertical, the purpose of which will be later explained. On the shaft 41 a wheel 63 is mounted driving an endless belt 64 which passes around the drive pulley 61. Also passing around the wheel 62 and over the belt 64 and around the pulley 62 is another endless belt 65 permitting the simultaneous driving of the cutter heads 59 and 60 in the same direction and at a very high rate of speed. It is designed that the journal bearings attached to the end frame 1 which carry shaft 41 may be adjusted up or down a limited distance so that when the mechanism as a whole is adjusted for different thicknesses of lumber the belt 64 and 65 may be kept as tight as is necessary for the proper driving of the cutting heads. The cutters on heads 59 and 60 are located slightly back of the guides 10 so that when a board such as indicated at 66 is fed through the machine under the rear drive chain it will be operated upon and have a groove and tongue cut in its upper side adjacent its forward edge and extending the full length of the board. The cutters on head 59 form the sides and boundaries of said tongue and groove at right angles to each other as indicated by the dotted lines $a$ in Fig. 25 while the cutters on head 60 being set at an angle finish the groove and the edge of the lumber giving it the inclined formation shown in full lines in Fig. 25.

Figure 27:
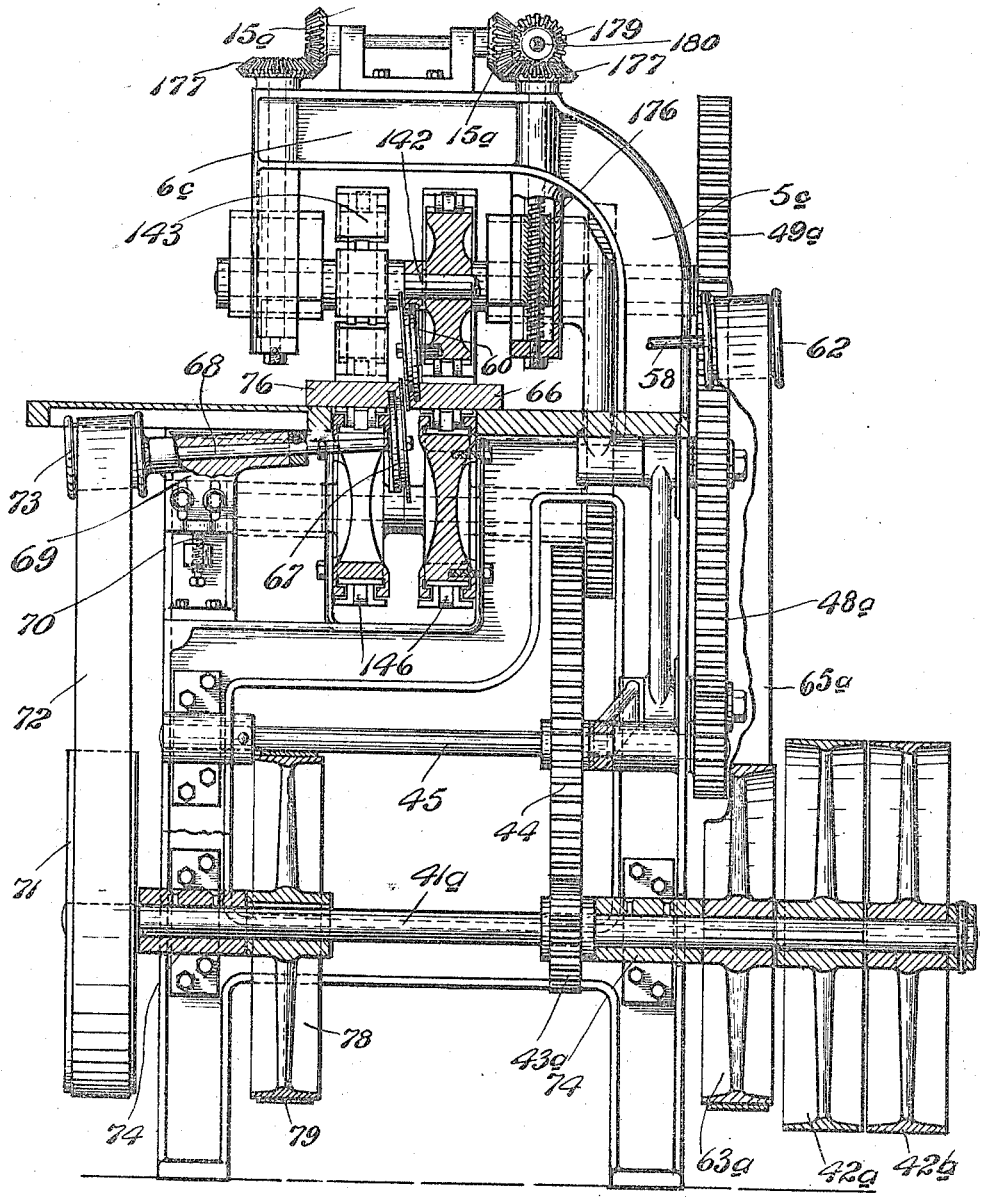
Fig. 27 is a vertical sectional view showing the parts in section and end elevation substantially on the line 27—27 of Fig. 26.

There are also mounted in front of and below cutter heads 59 and 60 similar cutter heads 67 on shafts 68 which are carried in bearings 69 adjustably mounted on the supporting frame and adapted to be adjusted up and down by means of the set screws 70. Of course the screw 54 may also be extended downwardly to enter and raise and lower said bearings. These additional cutter heads are shown in the modified construction shown in Fig. 27 but in both modifications they are the same and may be driven in the same manner, that is, a shaft may be mounted at the opposite end of the supporting frame from that of the drive shaft indicated at 41 in Fig. 2 and as 41ª in Fig. 27, said shaft carrying a drive wheel 71 around which the driving belt 72 may pass around the driving pulleys at the end of the shaft 68, these belts 72 and 72ª being similar in all respects to belts 64 and 56 which drive the upper cutter heads. The lower cutter heads are adapted to cut a groove on the underside and at the rear edge of a board passed under the front driving chain and in front of the guide 10, said board being illustrated at 76 in Figs. 25 and 27 and its finished formation being such as to coact with the edge of the board 66 which has been fashioned by the cutters on the upper cutting heads. The drive shaft 41 in the modification shown in Figs. 1 and 2 and 41ª shown in the Fig. 27, has a pulley 78 driving an endless belt 79 which passes around a similar wheel or pulley on the shaft 80 on which wheel 71 is mounted so that the lower cutters are continuously driven at the same speed as the upper cutters.

It is essential for the successful working of the machine that the coacting grooves and tongues in the two boards 66 and 76 to be joined together shall be wider at one end than at the other and shall gradually widen from the narrower to the wider end, this being necessitated by reason of the fact that if the coacting grooves and tongues were formed of the same width throughout, when a tongue was inserted in a groove, it would force any cementing material such as glue or the like and which in machines of this character is applied to said coacting parts, ahead of the tongue as it was inserted in the groove and thus prevent the proper gluing of the parts together; while if the narrower end of the tongue enters the wider end of the groove and gradually approaches the narrower end of said groove, at the same time the wider end of the tongue coming into the wider end of the groove, when the two pieces of lumber are positioned in proper relation to each other, the wedge shape tongue will completely fill the similarly shaped groove, yet the tongue and groove will retain the glue until such instant occurs. Accordingly, we have provided mechanism for effecting these functions. Beneath the upper cutter 60 a stationary housing having a base 81 and upwardly extending sides 82 is located, carrying between said sides a block 83 which is pivotally mounted on a shaft 84 extending through the block and through the sides of the housing. The shaft 84 passes through a downwardly extending projection 85 on block 83 and a strong coil spring 86 interposed between the rear end of block 83 and the base 81 has a tendency to tilt said block so as to depress its forward end, which end at its upper side is formed with a downward incline 87 immediately to the rear of which is mounted an idle roller 88 positioned directly above shaft 84. The shaft 84 is driven very slowly by any suitable connection of the worm gear 89 with the driving shaft of the machine. Inside of one of the sides 82 and connected to the shaft 84 is a spur gear 90 meshing with a gear 91 which in turn has engagement with a gear 92, said gears 91 and 92 being mounted on shafts 93 and 94, respectively, extending through the block 83, these shafts at the rear face of the block carrying smaller gears 95 and 96. A support 97 is located back of the housing and slidably carries a slide 98 projecting from which is a standard 99 with its upper end formed into a fork 100 to engage with a collar 101 mounted on the shaft 58. A screw 102 passes through the slide 98 and has a bearing at its forward end in the rear side 82 of the housing carrying at its forward end and directly back of the block 83 a spur pinion 103 which is located so that in one position of block 83 it will engage with gear 95 and in the other position with the opposite gear 96. Shaft 93 is extended through the rear side 82 of the housing and may move through the slot 104 as block 83 tilts. The slide 98 at its forward end is formed with a finger 105 having an inclined front edge or cam adapted to engage with a similar incline or cam 106 formed on the link 107 which is hung loosely upon the two shafts 93 and 84.

With this construction it will be evident that as the end of a board 66 reaches the roller 88 and bears thereagainst, block 83 will be tilted against the compression of spring 86 and gear 96 brought to engagement with gear 103 so that during the time that the board passes over the block 83 a continuous movement is given to slide 98 carrying it to the rear and simultaneously moving the cutter on head 59 to the rear so as to widen the groove cut thereby. This movement is very slow and may not amount in all to over a sixteenth or an eighth of an inch in a ten-foot length of board. As soon as the board passes by the block 83 and releases it, spring 86 throws gear 95 into mesh with gear 103 and the reverse movement of slide 98 is then effected, this movement continuing until the end of finger 105 engages with the incline 106 and forces the shaft 93 to the left (referring to Fig. 14) to cause the disengagement of gears 95 and 103, it being evident that when this disengagement is effected any further movement of the slides 98 is stopped and the gear 103 is positioned between gears 95 and 96 or is in neutral, no further action of mechanism occurring until a board such as shown at 66 is again entered under the cutter and over the block 83. A similar mechanism may be supplied for the lower cutter to make a gradual taper to the tongue and groove formed in the board on which it acts.

The mechanism so far described is that which is required for cutting the coacting tongues and grooves in two boards which are to be jointed together. When the boards have passed through they are delivered to the rear of the machine to an auxiliary device which will hold the first board in place and shift it into alinement with the second board as it is passed into the machine. This auxiliary device comprises a rear upright supporting frame 108 connected with the frame 2 by suitable braces 109. Rollers 110 are mounted above the frame work thus provided above which is mounted a carriage comprising a base 111 carrying two spaced apart brackets each having a horizontal portion $4^b$, a vertical portion $5^b$ at the rear forwardly extending portions $6^b$ and a downwardly extending supporting portion $7^b$ similar in all respects to the brackets comprised of parts 4, 5, 6 and 7 of the mechanism previously described. A table 112 in alinement with the table 8 is carried above the parts 4ᵇ and bearing plates 113 are located below the base 111 to cut down the friction as the carriage as a whole is moved over the rollers 110. A pair of endless chains constructed similar in all respects to the endless chains in the feeding mechanism and including the guiding and supporting structure comprised of parts 33, 34, 35, rollers 3 and springs 40 similar to said parts in the mechanism previously described, is mounted between supports 7ᵇ on shafts and around octagonal pulleys 26 in the same manner as are the forward feeding chains except that a special construction of pulley is formed for the forward end of the chains of this auxiliary mechanism. In this special construction on the front shaft 114 are mounted two pulleys 116 and 116ᵃ having octagonal outer surfaces the same as pulleys 26, pulley 116ᵃ being loose on the shaft 114 and having a projecting portion 115 formed with ratchet teeth extending into an annular portion 117 formed on the pulley 116, this latter pulley being keyed on the shaft 114. In the annular section 117 a plurality of dogs 118 are mounted which normally engage with the teeth on the part 115. Ratchet teeth 119 are also formed on the outer surface of the annular portion 117. A bar 120 of spring material is connected at its forward end to the bar 34 and has a stop dog 121 on its underside coming directly above part 117, the rear end of this bar extending to a bracket 122 which is attached to the member 6 at the rear of the structure previously described, this bracket having a slot 123 of inclined formation as shown in Fig. 21 into which the rear end of the bar 120 inserts.

Secured to the base 111 of the carriage are transverse bars 124 having central enlargements 125 in which are cut the diagonally disposed slots 126, these slots approaching each other at one end and diverging at the opposite end as shown. The rollers 110 are mounted between the flanges of channel irons 127 secured to the supporting structure for the carriage. A pair of parallel bars 128 pass through openings in the flanges of channels 127 and studs 129 on bars 128 project upwardly through the slots 126. There is also secured above the supporting structure for the carriage a bar 130 to which is pivotally connected a link 131 having slotted ends engaging with studs 132 secured to bars 128. At the forward end of each of the bars 128 is adjustably mounted a member 133 provided with upwardly extending ears 134 between which at its lower end is connected a lever 135 pivotally mounted between its ends to a bracket 136 extending from the rear of the supporting end frame 2. The upper ends of bars 135 extend into the path of movement of boards passing over the table 8 at either side of the guides 10 so that when a board is fed along a side of the guide 10 and is delivered from the table 8 to the table 112 its forward end strikes against a lever 135 and manipulates it to the rear, the effect thereof being to shift the table 112 and all of the mechanism connected therewith a distance; and similarly when a second board is fed through the machine on the opposite side of the guide 10 it engages with the opposite lever 135 and shifts the mechanism back to its original position. It will also be observed that mechanism consisting of a shaft 18ᵃ, pinions 19ᵃ, gears 14ᵃ and 15ᵃ and the like similar in all respects to the mechanism consisting of shaft 18, pinions 14, 15 and 19, is used to raise and lower the chains which are mounted on the rear carriage for different thicknesses of lumber, this shifting mechanism being easily changed for a different thickness of lumber with practically no loss of time.

The operation of the construction so far as described will now be outlined. With the drive wheel 42 driven from any suitable source of power both drive chains above the table 8 are continuously driven and both the upper and lower cutters will move at a high rate of speed. In operation a board such as indicated at 66 is fed under the rear driving chain and back of the guide 10, and is acted upon by the upper cutters thence passing from the table 8 to the table 112. It engages against a lever 135 so as to bring the rear chain carried by the carriage directly back of the rear feeding chain. The board passes under this idle chain which is around pulley 116 causing it to move, it being evident that the movement of the chain causes a rotation of pulley 116 and, by reason of the engagement of pawls 118 mounted on part 117 with the teeth on part 115, pulley 116 is also turned both of the idle chains moving. Simultaneously with the cutting of the tongue and groove in the board 66, the tapering of the slot and groove occurs as previously described. After this board has been passed under the rear idle chain a second board is then passed under the front driving chain in front of the guides 10 and as its end comes against its lever 135 the carriage consisting of base 111 and the mechanism above it is shifted over so that the tongue and groove on the board 66 will be in direct alinement with the groove and tongue on the board 76. At the same time the shiftings of the carriage carries bar 120 down the incline of slot 123 so that the part 121 engages with a tooth 119 of the ratchet on the part 117. When board 76 is passed under the front chain, accordingly, and its tongue and groove enters the groove and tongue of board 66, the consequent friction of said parts tending to move board 66 is not effective to so move the board, pulley 116 and the chain around it being held from any movement. Pulley 116ª may freely rotate, dogs 118 slipping over the teeth on the part 115 or until the board 76 is moved to a position such that its tongue and groove engages the entire length of the groove and tongue of board 66. A third board is now passed through the machine back of the guides 10 and when it strikes a lever 135 the carriage is shifted, bar 120 riding up the incline of slot 123 and lifting the dog 121 away from teeth 119 so as to permit the third board when it strikes the two boards which have been joined together to force said joined boards ahead of it and out of the machine. The two joined boards may now be passed in front of the guide 10 and joined with the third board in the same manner and the process thus continued indefinitely.

I have found it advisable to make a slight modification in the links and in the driving of the driving chains, this modification in the driving consisting of placing projections 137 in the nature of sprocket teeth on the octagonal driving pulleys 26 and in forming the links with a central open portion in which dogs 32ª similar to the dogs 32 previously described may be mounted, each dog having a projection 138 and each link being cut off at an incline as shown at 139 so that when the driving links of the driving chain come to the driving pulleys projections 137 engage against projections 138 and tend to withdraw the dogs into the body of the link. Also as the links pass around the rear pulleys 26, the portion cut off at 139 is out of the way so that it does not strike against the board underneath it. If dogs 32ª were not thus drawn within the body of the link, liability of the projecting end of the dog engaging with the rear end of a board which has been passed to the carriage but not far enough forward to escape the dog occurs, the dog catching against the end of the board and breaking splinters therefrom.

Many modifications in construction will occur to others and have occurred to us respecting the mechanism of this machine and in Figs. 26 to 30 inclusive we have incorporated several of these modified features. The frame work of the modified construction comprises an end frame 108ª similar to the frame 108, an intermediate frame 2ª located the same as the frame 2 is in the construction previously described and between frames 2ª and 108ª is located an auxiliary supporting frame 140, all of the frames being connected suitably together to make a rigid supporting structure. The frame 140 has an extension at the rear as indicated at 5ᶜ serving as a support in the same manner that the extension 5 serves as a support in the other construction, for a box 141 in which is mounted a bearing for a shaft 142, this shaft and the shaft 25ª at the front of the machine carrying the octagonal pulleys around which the upper feed chains are mounted, said chains being denoted at 143 in Fig. 26. Mounted directly below shaft 25ª is a parallel shaft 144 while back of the frame 2ª and in the same plane with shaft 144 is suitably mounted another shaft 145, these shafts also each carrying a pair of octagonal pulleys similar to the pulleys 26 previously described around which are positioned the endless chains 146. It will be noted that these endless chains 146 are directly below the feed chains 143 but do not extend as far back in the machine. Guides 147 are located between the upper and lower chains to serve in guiding a board underneath one of the upper feed chains. On shaft 144 a sprocket wheel 148 is mounted which is driven by gears 149 from the shaft 25ª, this shaft being driven from shaft 41ª by a plurality of gears of substantially the same construction and effect as those interposed between shafts 41 and 25 in the construction shown in Figs. 1, 2 and 3. Frames 140 and 108ª are provided with cross members 150 on which is mounted a movable carriage 151, on rollers so as to have limited back and forward movement. On upright portions of this carriage are mounted boxes 152 which receive the bearings for a shaft 153 and also boxes 154 containing bearings for shaft 155, each of these carrying pulleys around which passes endless chains 156. Shafts 152 and 155 lie in the same horizontal plane with shafts 144 and 145 and the construction of the pulleys located on shafts 155 is similar to that on shaft 144 as shown in Figs. 8 and 20. The construction of the chains 156 and 146 is identical with the various chain constructions previously described.

Figure 30:
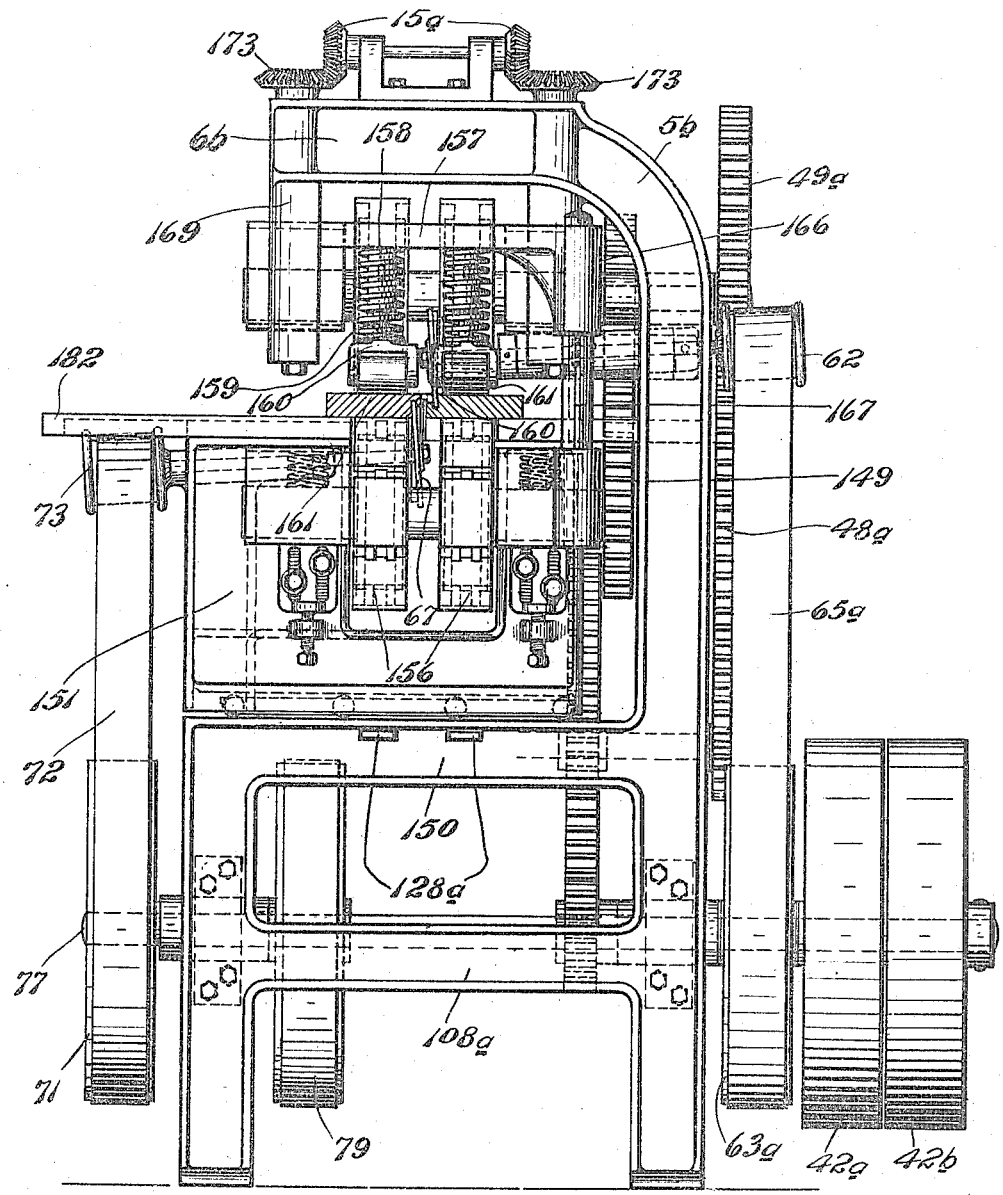
Fig. 30 is an end view taken from the left of Fig. 26.

Located a distance above the idle chains 156 and substantially in a plane with the upper run of the chains 143 is a plate 157 depending from which are a plurality of studs 158 in which telescope pins 159. Studs 158 and pins 159 project downwardly in pairs from plate 157 and at the lower ends of a pair of pins 159 as shown in Fig. 30, a fork is formed to serve as a mount for a comparatively wide roller 161 which is located directly above chains 156. Strong coil springs press these rollers downwardly and the downward movement being limited by a pin and slot connection between parts 158 and 159 as shown in Fig. 30. At its forward end the plate 157 is forked to provide two branches 162 on the front of each of which is mounted a slide which is received in a guide 163 mounted at the rear end of each of the boxes 141. Sleeves are also formed in the members 162 to receive upright rods or posts 164 which extend downwardly into the sleeves 165 formed on the rear boxes 154 as shown in Fig. 26 while, similarly, at the rear end of plate 157 a vertical sleeve 166 is provided in which is secured a post 167 extending downwardly into a sleeve 168 formed on the rear box 152 previously described. These posts 164 and 167 are rigidly attached to the plate 157 but have slidable movement in sleeves 165 and 168.

The rear frame 108$^a$ is extended upwardly at its rear side to form an upright 5$^b$ which is then turned forward over the plate 157 forming a horizontal support 6$^b$ from which downwardly project two vertical guides 169. In these guides are mounted blocks 170 through which thread screws 171, the screws passing upwardly through the horizontal member 6$^b$. Blocks 170 are slotted to receive the edges of plate 157 and the distance between the bottoms of said slots is wider than is the width of plate 157 so that this plate may have a limited movement back and forth with respect to the blocks. The bottoms of the blocks are indicated at 172 in dotted outline in Fig. 29 and show the limit of movement of the plate 157. Each of the screws 171 at its upper end carries a bevel pinion 173.

The blocks 174 which support the box 141 previously noted are slidably mounted for vertical movements in downwardly projecting guides 175 which extend downwardly from the horizontal member 6$^c$ formed as an extension of the vertical portion 5$^c$ of frame 140. Screws 176 pass through the blocks 174 and upwardly through horizontal support 5$^c$ at the upper end having a bevel pinion 177 fixed thereto. A bevel pinion 178 meshes with one pinion 173 and a bevel pinion 179 meshes with the pinion 177, these pinions being fixed to a shaft 180 which extends the full length of the machine and which carries pinions 19$^b$ meshing with pinions 14$^b$ and also a pinion 56$^a$ meshing with a pinion 55$^a$ which pinions are carried at the upper ends of screws for the raising and lowering of the front end of the upper driving chains and of the upper cutters, the same as pinions 14 and 19, 55 and 56 raise and lower said elements in the modification first described. To operate the pinions 177 and 173, 14$^b$ and 55$^a$ in unison pinions 15$^a$ on a cross shaft are used similar to the construction of the first modification.

A table 181 is located in the forward portion of the machine in such relation that its upper surface comes directly in alinement with or slightly below the upper surfaces of the links of the upper runs of chains 146. Boards entered into the mechanism between chains 143 and 146 at either side of the guides 147 are carried through the machine and beyond the rear end of table 181 on to the table 182, which is on the carriage 151, so that its upper surface lies in substantially the same plane with the upper surfaces of the links of the upper runs of chains 156. The shifting of the carriage 151 is accomplished by exactly the same mechanism as that shown in Fig. 7, the location of bars 128$^a$ similar to bars 128 of the shifting mechanism shown in Fig. 7 being indicated in Fig. 30. When the carriage is shifted the slides mounted on parts 162 will move in the guides 163 and the rear end of plate 157 will move in the slots 170. These modifications shown in Figs. 26 to 30 inclusive are of value in that only one operation is necessary for the raising and lowering of upper chains 143 and of the plate 157 for different thicknesses of lumber, there being no liability to different adjustments of the two parts of the machine as in the modification shown in Figs. 1, 2 and 3. Furthermore the extension of the upper drive chains 143 beyond the lower chains 146 and beyond the table 181 serves to carry the boards beyond the gap which, as shown in Fig. 1, lies between the front and rear chains. With short boards this is of especial value as many times a short piece carried under the feed chain of the construction shown in Fig. 1 is not forced far enough under the idle chains above platform 112 so that it will be properly held in position which cannot occur in the modified construction shown in Fig. 26.

From the foregoing it will be evident that we have provided a machine for joining lumber together that occupies relatively little space and one in which the adjustment of the mechanism for working on boards of various thicknesses may be quickly effected. All that is necessary to adjust the mechanism in Fig. 26 for boards of different thicknesses is to turn the rod 180 to raise or lower the upper part of the mechanism any desired distance, this effectually and at the same time properly locating the upper cutter heads. The lower cutter heads may then be adjusted to place. And the only other adjustment that may then be needed is one for tightening the various belts 64, 65, 72 and 72$^a$. The change in the machine will require but very little time and this is a matter of great consequence and importance in machines of this character. Furthermore with this machine skilled labor is not necessary but practically any one who can feed a board into the machine can operate it. Various other features of merit of novelty and utility other than those defined will be apparent to others skilled in the art. Various other modifications in structure will also occur to those skilled in the art. For instance, one of the supports 140 or 2 may be eliminated in the structure shown in Fig. 26 and the rear shafts for the upper and lower feed chains mounted in one support, and many other changes of like character made. Accordingly we do not wish to be limited to the specific disclosure made but consider ourselves entitled to all modifications of structure falling within the scope of the appended claims which define the invention.

We claim:—

1. In a machine of the character described, the combination of cutting mechanism for cutting coacting joint members in two boards passed through the machine one after the other feeding mechanism for moving the boards by said cutting mechanism, shifting means for moving the first board cut laterally into position for its joint members to be engaged by the joint members of the following board and means for holding the first board against movement while the second board is joining therewith automatically operated by the movement of the shifting means, said shifting means including devices for returning the first board to its original position after joining with the second board to thereby free both boards for ejectment from the machine, said devices being operated by the feeding of the first board of a succeeding pair of boards into the machine.

2. In a machine of the character described, the combination of cutting mechanism for cutting coacting joint members in the contiguous edges of two boards passed through the machine one after the other, a centrally located guide on opposite sides of which the boards are fed, feeding mechanism for carrying the boards by said cutting mechanism, shifting means for moving the first board cut laterally into position for its joint members to be engaged by the joint members in the following board, means for holding the first board against movement while the second board is joining therewith including devices automatically operated by the action of the shifting means in laterally moving said first board, and means to automatically free said boards for longitudinal movement after joining the same together operated automatically by the next succeeding board passed through the machine, said boards thus joined together being ejected by the next succeeding board.

3. In a machine of the character described, a support provided with a centrally located guide, feeding mechanism for moving boards over the support on both sides of the guide, cutters for cutting coacting joint members lengthwise of the boards at the edges thereof adjacent the guide, a table to which the boards are passed, said table being mounted for lateral movements in either direction, a shifting mechanism associated with the table for alternately shifting it laterally in opposite directions, devices extending into the paths of movement of boards passed through the machine on both sides of the guide for operating the shifting mechanism whereby said shifting mechanism is operated as the forward end of a board strikes against the device in its path of movement, means to drive the feeding mechanism, and means to drive the cutters.

4. In combination, a support, feeding mechanism for moving boards lengthwise of the support, a central guide on the support on either side of which boards are alternately fed, a carriage movably mounted on the support, bars each provided with a pair of diagonally positioned slots secured to the underside and transversely of the carriage, said slots approaching each other at one end, a pair of bars slidably mounted on the support below and lengthwise of the carriage, studs from said bars entering the slots, and means connected to one end of each of said pair of bars and extending into the paths of movement of boards passed to the carriage from either side of the guide for slidably operating them.

5. In combination, a support, a carriage movably mounted thereon, a table on the carriage, a table having a central longitudinal guide located in front of the carriage table and in the same horizontal plane, bars each provided with a pair of diagonally positioned slots secured to the underside and transversely of the carriage, said slots approaching each other at their front ends, a pair of bars slidably mounted on the support below and lengthwise of the carriage, studs from said bars entering the slots, levers pivotally mounted between the ends to the support and connected at their lower ends one to each of the pair of bars, the upper ends of said levers extending to a point between the tables, one of said levers lying to one side and the other to the other side of the guide, and means for feeding boards over the second mentioned table alternately on opposite sides of the guide, and means for cutting co-acting joint members in adjacent edges of said boards, substantially as described.

6. In a machine of the character described, a support, a table and carriage in the support, said table being located in front of the carriage, a central longitudinal guide on the table, cutters located at each side of the guide adapted to cut coacting joint members at the edges of boards passed through the machine said edges of the boards being passed along the guide, feeding mechanism for carrying boards through the machine over the table at each side of the guide, means to operate the feeding mechanism and cutters, a second table in the carriage back of and in the same plane with the first table, means for mounting the carriage for movements in opposite directions transverse to the length of the machine, a shifting mechanism between the carriage and support including means for alternately moving the carriage in opposite directions, and a pair of actuating devices connected with the shifting mechanism extending slightly above the tables and between them, one being positioned at each side of the guide whereby the passage of boards alternately first on one side and then on the other of the guides will operate the shifting means to position the joint members of a pair of boards fed through the machine in alinement, substantially as described.

7. In combination, a support, a table thereon, a guide projecting upwardly from the table between its front and rear edges, means to carry boards over the table at either side of the guide, means to form a groove and tongue on a board passed over the table back of the guide, a carriage movably mounted on the support, a table therein in alinement with the first table to receive boards passed from the first table, means to form a tongue and groove on a second board passed over the first table in front of the guide, shifting means interposed between the carriage and its support, means connected to the shifting means and operated as said board passes to the second table for shifting the carriage to bring the tongues and grooves of two boards passed through the machine into alinement, and means rendered effective by shifting of the carriage for holding the first board passed through the machine in fixed position while the second board is passing through and joining therewith.

8. In combination, a support, a carriage thereon, shafts on the carriage, a pair of endless chains passing around the shafts, a table adjacent the chains, means to shift the carriage back and forth over its support in a direction at right angles to the length of the table, and means automatically operated by the shifting of the carriage to one of its positions to fix one of the chains against movement in one direction while the other remains free for movement in said direction, said chains being both free for movement in said direction when the carriage is in the other of its positions.

9. In combination, a support, a carriage movably mounted thereon, means to shift the carriage back and forth in a direction at right angles to the length thereof, shafts carried by the carriage adjacent its front and rear ends, a pair of pulleys loosely mounted on the rear shaft, a pulley keyed to the front shaft having a section provided with ratchet teeth, a second pulley loosely mounted on the front shaft and provided with an annular portion formed with ratchet teeth in its outer surface and extending over the toothed section of the first pulley, pawls mounted on said annular sections in slots therein and engaging with the teeth of said section, a bar mounted on the carriage extending over said annular portion, a fixed pawl projecting from said bar toward the teeth thereon, and a fixed guide engaging with the free end of the bar for raising and lowering said bar and pawl with the shifting of the carriage.

10. In a machine of the character described, a support, a carriage therein, a table on the carriage, cutting mechanism for cutting coacting joint members at the adjacent edges of two boards passed in succession through the machine, feeding mechanism for moving the boards by said cutting mechanism to said table, means to shift the carriage and attached table back and forth over the support in a direction at right angles to the table, separate means supported by the carriage and under which boards pass, each of two boards passed through the machine in succession being engaged by one of said means, means automatically operated by the shifting of the carriage to one position to actuate one of said means to hold the board thereunder against movement, the other of said means being unaffected, said means both being unaffected when the carriage is in its other position.

In testimony whereof we affix our signatures.

GLENN DICKERSON.
DE FOREST HAMILTON.

Copies of this patent may be obtained for five cents each, by addressing the "Commissioner of Patents, Washington, D. C."